US008368745B2

(12) United States Patent
Nam et al.

(10) Patent No.: US 8,368,745 B2
(45) Date of Patent: Feb. 5, 2013

(54) APPARATUS AND METHOD TO CONCURRENTLY DISPLAY TWO AND THREE DIMENSIONAL IMAGES (75) Inventors: Dong Kyung Nam, Yongin-si (KR); Yun-Tae Kim, Suwon-si (KR); Du-Sik Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 434 days.

(21) Appl. No.: 12/453,114

(22) Filed: Apr. 29, 2009

(65) Prior Publication Data

US 2010/0073467 A1 Mar. 25, 2010

(30) Foreign Application Priority Data

Sep. 19, 2008 (KR) ........................ 10-2008-0092101

(51) Int. Cl.
*H04N 13/04* (2006.01)
*G02F 1/1335* (2006.01)
(52) U.S. Cl. ................ 348/59; 348/51; 349/15
(58) Field of Classification Search ................ None
See application file for complete search history.

(56) References Cited

U.S. PATENT DOCUMENTS

| | | | |
|---|---|---|---|
| 5,493,427 A * | 2/1996 | Nomura et al. | .......... 349/5 |
| 5,838,494 A | 11/1998 | Araki | |
| 5,905,593 A | 5/1999 | Lo et al. | |
| 2002/0075566 A1 | 6/2002 | Tutt et al. | |
| 2003/0016444 A1 | 1/2003 | Brown et al. | |
| 2004/0169919 A1 | 9/2004 | Uehara et al. | |
| 2005/0057807 A1 | 3/2005 | Takagi et al. | |
| 2007/0114907 A1 | 5/2007 | Chiang et al. | |
| 2008/0204548 A1 | 8/2008 | Goulanian et al. | |
| 2008/0278640 A1 * | 11/2008 | Ijzerman et al. | .......... 349/15 |

FOREIGN PATENT DOCUMENTS

| | | |
|---|---|---|
| EP | 1 708 010 A1 | 10/2006 |
| JP | 11-295817 | 10/1999 |
| JP | 2003029205 | 1/2003 |
| JP | 2008-026654 | 2/2008 |
| KR | 10-2008-0031302 | 4/2008 |

OTHER PUBLICATIONS

Dodgson N. A.: "Autostereoscopic 3D Displays," Computer IEEE Comput. Soc USA, vol. 38, N. 8, Aug. 2005, pp. 13-36, XP002562921.
Extended European Search Report dated Feb. 25, 2010 corresponds to European Patent Application 09168997.6-1234.

* cited by examiner

*Primary Examiner* — Wen-Tai Lin
(74) *Attorney, Agent, or Firm* — Staas & Halsey LLP (57) ABSTRACT An image display apparatus and method to simultaneously display two dimensional (2D) and three dimensional (3D) images with minimized visual 3D discomfort. The image display apparatus may include a lens unit to spatially separate images displayed in a display panel unit to thereby simultaneously form a 2D image viewing area and a 3D image viewing area, respectively, enabling the simultaneous displaying of the 2D images and the 3D images.

18 Claims, 12 Drawing Sheets

APPARATUS AND METHOD TO CONCURRENTLY DISPLAY TWO AND THREE DIMENSIONAL IMAGES

CROSS-REFERENCE TO RELATED APPLICATIONS

This application claims the benefit of Korean Patent Application No. 10-2008-0092101, filed on Sep. 19, 2008, in the Korean Intellectual Property Office, the disclosure of which is incorporated herein by reference.

BACKGROUND

1. Field

One or more embodiments relate to an apparatus and method to concurrently display both two dimensional (2D) and three dimensional (3D) images, and more particularly, to an apparatus and method to concurrently display 2D and 3D images that may be applicable in TVs in homes, monitors, displays of portable devices, displays for advertisement and education, and the like.

2. Description of the Related Art

Techniques for displaying a three dimensional (3D) image may be briefly divided into glasses and a non-glasses types.

The glasses type may be further divided into an anaglyph type, a shutter-glasses type, a polarized-glasses type, and the like. The non-glasses type may mostly utilize a lenticular lens or a parallax barrier to implement the 3D image, and may be further divided into a stereo image displaying technique and a multi-view image displaying technique.

In displaying 3D images, various viewing inconveniences may occur that do not occur in 2D image displays. For example, the glasses-type stereo display may present the left and the right image sequentially or simultaneously depending on the display techniques, which results in users who do not wear the 3D glasses being discomforted by the overlapped images and feel dizzy.

Also, for the non-glasses case, there may exist an optimum 3D viewing position, which will be called herein the sweet spot, where the user can see the 3D images most clearly. As the sweet spot may be spatially limited and generally narrow, users who are located outside the sweet spot may see a distorted 3D image, which again may causes the users to suffer from dizziness and headaches.

In considering the home TV environment, some users may desire to watch 3D movie by wearing the 3D glasses, and at the same time other users may not want to wear such 3D glasses. Here, a problem exists in that users who do not wear 3D glasses can not watch even 2D images clearly, as well as also not being able to view the 3D image. Also in the non-glasses case, a few users may watch clear 3D image from the sweet spot, while other users may only view either 2D or 3D images with discomfort. Thus in both cases, some users who do not wear the 3D glasses or are not located on the precise sweet spot may experience severe discomfort, which makes such current 3D display techniques inadequate for the multi-user situation such as home TV or public display environment. Adding to this, some users, such as the elderly, may actually favor 2D images over 3D images. Thus, there is a need for a display apparatus which may enable a multi-user display technique to watch both 2D and 3D image at the same time without inconvenience.

SUMMARY

One or more embodiments may provide an image display apparatus and method which may simultaneously display two dimensional (2D) images and three dimensional (3D) images.

One or more embodiments may also provide an image display apparatus and method in which a user desiring to view 3D images may view 3D images with a relatively high image quality without requiring the wearing of glasses, and also the user desiring to view 2D images may view superior 2D images without deterioration in image quality.

One or more embodiments may further provide an image display apparatus and method which may prevent the 3D fatigue or discomfort from occurring in viewing both of 3D and 2D images.

To accomplish the above and/or other advantages, one or more embodiments may include an image display apparatus, including a display panel unit to display images, and a lens unit to spatially separate the images simultaneously displayed by the display panel unit to form a two dimensional (2D) image display area, providing display of a 2D image, and a three dimensional (3D) image display area, providing display of a 3D image.

Here, the images displayed by the display panel unit may be related left and right images.

In addition, the lens unit may include a lenticular lens having full viewing angle-display characteristics based on a corresponding high refractive index. Further, the lenticular lens may have a refractive index of 2 or more, with a curvature radius and a lens thickness being determined according to the refractive index.

To accomplish the above and/or other advantages, one or more embodiments may include an image display method including controlling a plurality of aligned lenses by spatially separating a first image to form at least one first image viewing area to display at least a 2D image, spatially separating a second image to form at least one second image viewing area to display at least a 2D image, and spatially separating an image resulting from a combination of the first and second images to form at least one third image viewing area to display at least a 3D image, with the first and second images being to be correspondingly simultaneously displayed in the first, second, and third image view areas.

To accomplish the above and/or other advantages, one or more embodiments may include an image display apparatus including a lenticular lens controller to control a lenticular lens unit to spatially separate a first image, of at least a first and second images, to form at least one first image viewing area to display at least a 2D image, and spatially separate an image resulting from a combination of the first and second images to form at least one other image viewing area to display at least a 3D image, with the first and second images being correspondingly simultaneously displayed at least in the first and other image viewing areas.

The image display apparatus may further include a display panel unit to display separate images including the first and second respective images, and the lenticular lens unit to spatially separate the first image to form the at least one first image viewing area and spatially separate the image resulting from the combination of the first and second images to form the at least one other image viewing area.

To accomplish the above and/or other advantages, one or more embodiments may include an image display apparatus, including a display panel unit to display a stereo image including a left image and a right image, and a lenticular lens unit to spatially separate the left image to form a left image viewing area, spatially separate the right image to form a right image viewing area, and spatially separate the stereo image to form a 3D image viewing area.

The image display apparatus may include a control unit to control movement of lenses of the lenticular lens unit to control a spatial location of the 3D image viewing area. Further, the image display apparatus may include a control unit to selectively control display of the stereo image so that an entire viewing area is displayed as a 2D image and so that 2D images and the stereo image are simultaneously displayed.

The lenticular lens unit may be included with a plurality of lens columns, each pitch of the plurality of lens columns being 2p, with p being a pitch of pixels making up a corresponding display panel of the display panel unit, and a curvature radius and focal length of each of the plurality of lens columns being determined according to a refractive index of the lenticular lens.

The refractive index may be 2, a curvature radius of each of the plurality of lens columns may be 2p, and a focal length may be 4p. Further, the refractive index may be 2.5, a curvature radius of each of the plurality of lens columns may be 1.39p, and a focal length may be 2.31p.

To accomplish the above and/or other advantages, one or more embodiments may include an image display method including controlling plural aligned lenses to spatially separate a first image, of at least a first and second images, to form at least one first image viewing area to display at least a 2D image, and spatially separate an image resulting from a combination of the first and second images to form at least one other image viewing area to display at least a 3D image, with the first and second images defined for correspondingly simultaneously being displayed at least in the first and other image viewing areas.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Reference will now be made in detail to embodiments, examples of which are illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

An image display apparatus according to one or more embodiments may be directed to a display apparatus that may simultaneously display a two dimensional (2D) image and a three dimensional (3D) image that may be viewed without requiring a user to wear glasses. Also, the image display apparatus according to the one or more embodiments may spatially divide/separate a 2D image viewing area and a 3D image viewing area, so that a user located in the 2D image viewing area can simultaneously view 2D images while another user located in the 3D image viewing area can view 3D images.

Also, the image display apparatus according to one or more embodiments may be directed to a technique in which an image inversion does not occur with respect to an entire viewing area. Here, the image inversion may denote a phenomenon in which left images are applied to a right eye and right images are applied to a left eye when displaying 3D images, thereby incurring cognitive confusion. In this manner, the image display apparatus may include a lens having wide viewing angle characteristics or full viewing angle characteristics.

Figure 1:
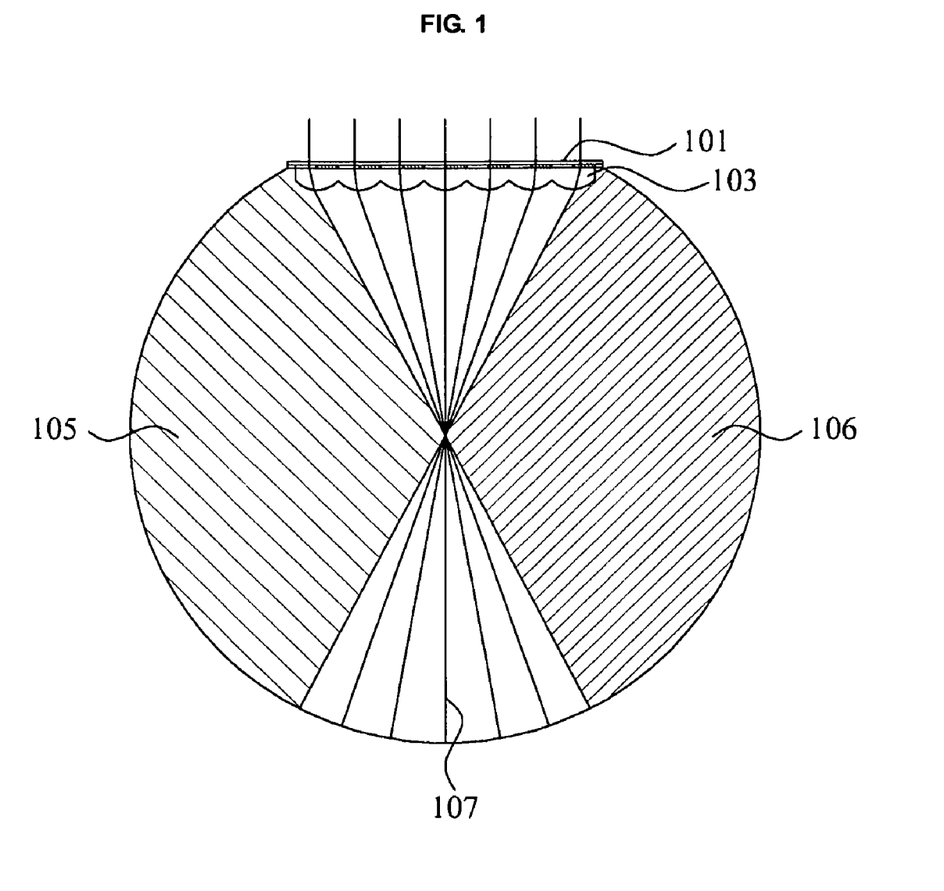
FIG. 1 illustrates a configuration of an image display apparatus, according to one or more embodiments.

FIG. 1 illustrates a configuration of an image display apparatus, according to one or more embodiments. Herein, throughout the following description, the term apparatus should be considered synonymous with elements of a physical system, not limited to a single enclosure or all described elements embodied in single respective enclosures in all embodiments, but rather, depending on embodiment, is open to being embodied together or separately in differing enclosures and/or locations through differing elements. As only another example, a respective apparatus/system or method could also be controlled through one or more processing elements/devices or implemented through a distributed network, noting that additional and alternative embodiments are equally available.

Referring to FIG. 1, the image display apparatus according to one or more embodiments may include a display panel unit 101 and a lens unit 103, for example.

The display panel unit 101 may display input images, such as provided from an included or separate image providing apparatus. The input images provided from the image providing apparatus may be stereo images, for example, including left images and right images.

The lens unit 103 may spatially divide the images displayed in the display panel unit 101 to thereby simultaneously form a viewing area 105 through which left images are selectively displayed, a viewing area 106 through which right images are selectively displayed, and a viewing area 107 through which overlapped images are selectively displayed. For example, the lenticular lens may have a refractive index of 2 or more, with a curvature radius and a lens thickness being determined according to the refractive index.

Figure 2:
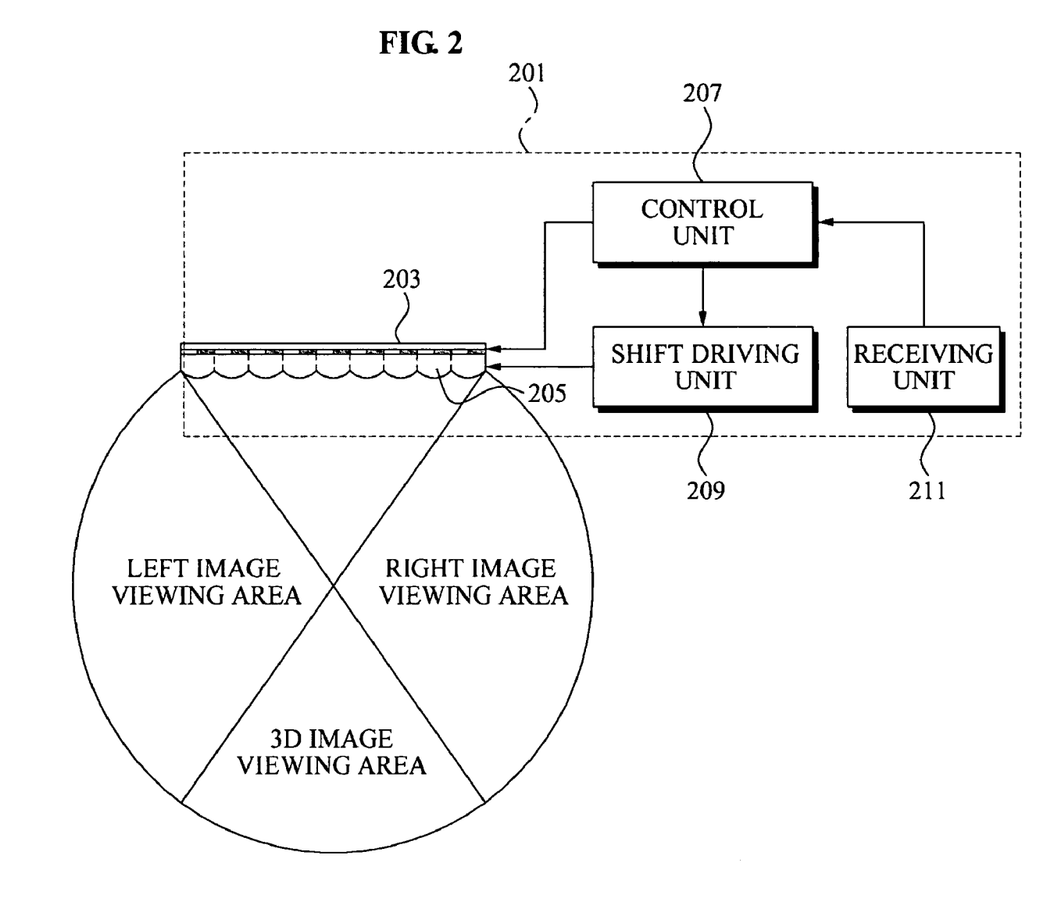
FIG. 2 illustrates a configuration of an image display apparatus, according to one or more embodiments.

FIG. 2 illustrates a configuration of an image display apparatus 201, according to one or more embodiments.

Referring to FIG. 2, the image display apparatus 201 may include a display panel unit 203, a lenticular lens unit 205, a control unit 207, a shift driving unit 209, and a receiving unit 211, for example, noting that alternative embodiments are equally available.

The display panel unit 203 may display stereo images made up of left images and right images, for example.

Specifically, the display panel unit 203 may be a panel displaying 2D images, and implemented as various display devices such as a liquid crystal display (LCD), a plasma display panel (PDP), a light emitting diode (LED), an organic light emitting diode (OLED), a cathode ray tube (CRT), a projector, and the like. The display panel unit 203 may, for example, display image information through display pixels. In this instance, each of the display pixels may be configured of sub pixels displaying color information or brightness information, also as an example.

The lenticular lens unit 205 may be controlled and/or configured to spatially divide the left and right images to respectively form left and right image viewing areas, and also spatially divide the stereo images to form a 3D image viewing area.

The lenticular lens unit 205 may be made up of a lenticular lens having refractive characteristics. The lenticular lens may further be implemented by a transparent optical device, and optical glasses such as crown glasses and flint glasses and optical plastics such as acrylic and polymethyl methacrylate (PMMA) may be used as the lenticular lens, noting that alternatives are equally available.

In an embodiment, the lenticular lens unit 205 may be made up of a plurality of lens columns, and two pairs of display pixels may correspond to a single lens column to thereby be used for forming stereo images, again noting that alternatives are equally available.

In general, the lenticular lens may be used for forming an optimum viewing location, that is, the aforementioned sweet spot. However, as a potential selective alternative, according to an embodiment, the lenticular lens may be used for forming a wide viewing angle or full viewing angle. Thus, according to an embodiment, the lenticualr lens may be differently used and have different purposes, as well as type and materials in comparison with a general lenticular lens, examples of which will be described in detail later.

The control unit 207 may selectively control the stereo images so that an entire viewing area is displayed as the 2D image viewing area, or 2D and 3D images are simultaneously displayed, for example.

Specifically, in this example, the control unit 207 may control the operation of the lenticular lens such that that left and right images are displayed as identical images when contents corresponding to input images are 2D images, thereby displaying the entire viewing area as 2D images. Similarly, the control unit 207 may display the entire viewing area as 2D images depending on selection of a user, or simultaneously display 2D and 3D images.

Also, the control unit 207 may shift the lenticular lens unit 205 to control a location of the 3D image viewing area. In this instance, the shift driving unit 209 may shift the lenticular lens unit 205 in at least one of left or right side directions, for example, depending on the control of the control unit 207 to form at least one 3D image viewing area, noting that alternative embodiments are equally available.

In such an embodiment, the control unit 207 may further sense a location of a user to shift the lenticular lens unit 205, and/or may shift the lenticular lens unit 205 based on a selection of the user.

Figure 3:
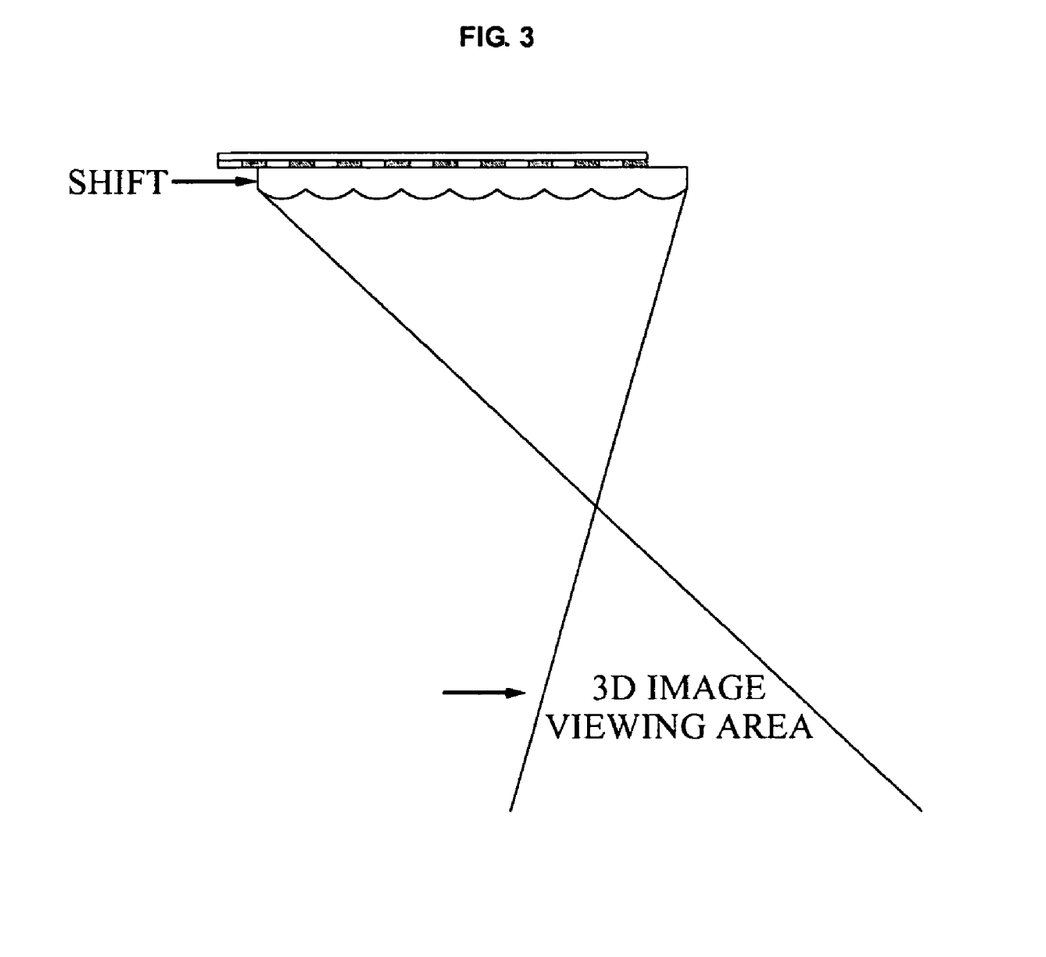
FIG. 3 illustrates a change in location of a three dimensional (3D) image viewing area depending on a shift of a lenticular lens, according to one or more embodiments.

In this example, the 3D image viewing area may be moved in a direction in which the lenticular lens unit 205 is shifted, as shown in FIG. 3.

In an embodiment, including the receiving unit 211, the receiving unit 211 may include a sensor (not shown) for sensing location of a user. Also, the receiving unit 211 may receive signals input through a remote control by a user, and transmit the received signals to the control unit 207.

Figure 4:
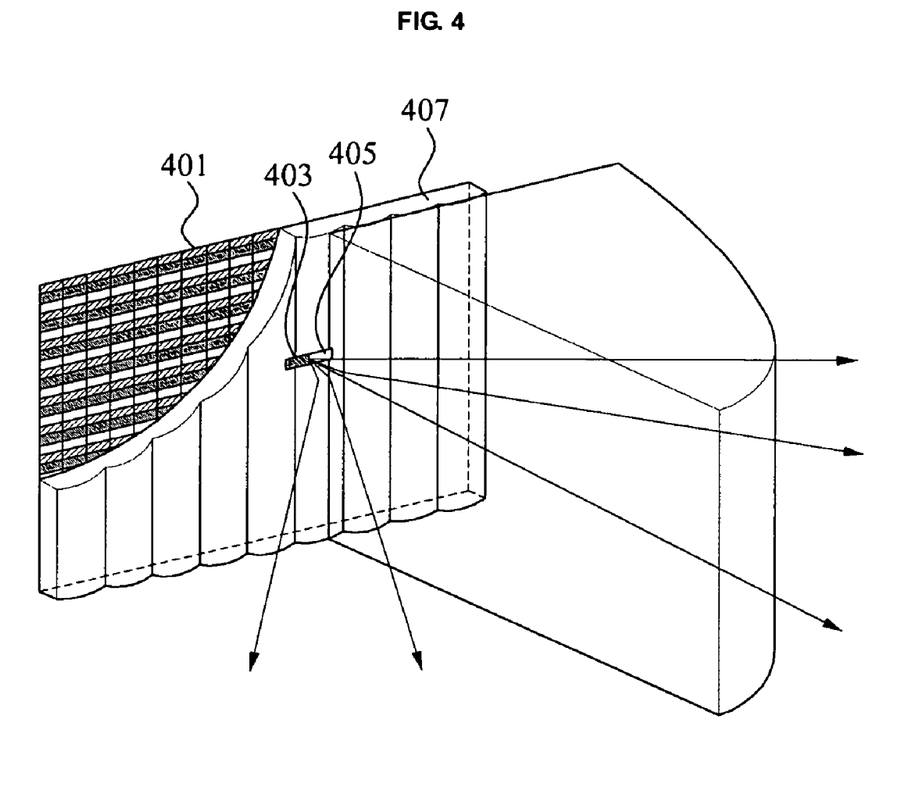
FIG. 4 illustrates a configuration of a pixel of an image display apparatus, according to one or more embodiments.
Figure 5:
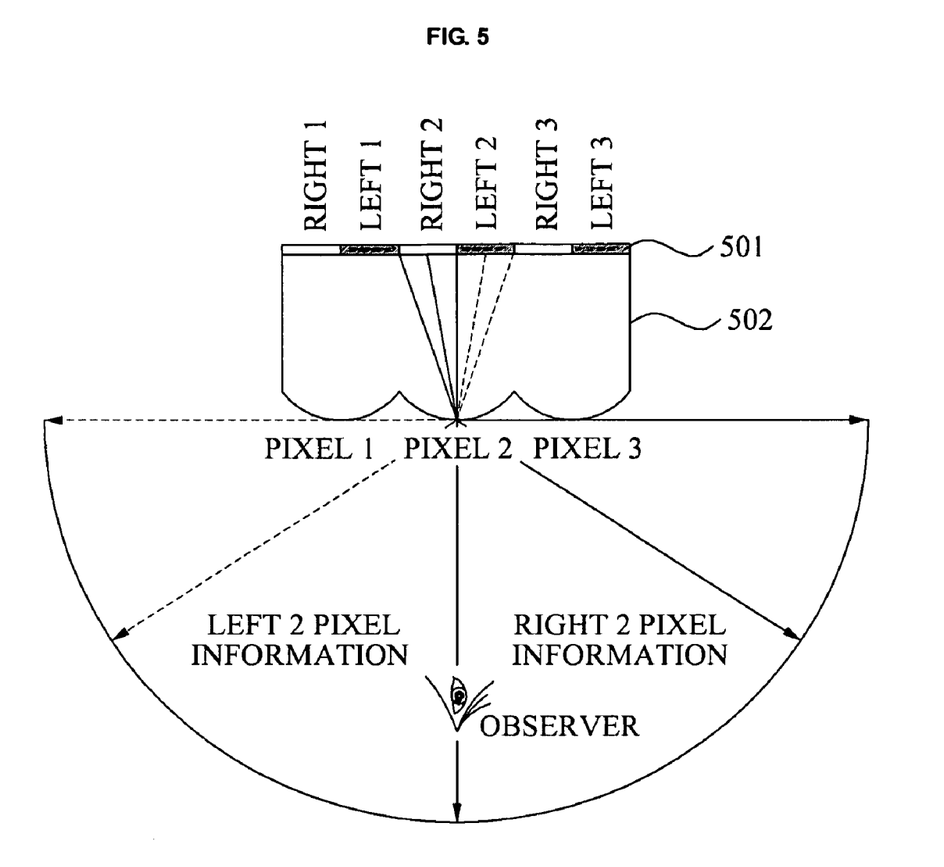
FIG. 5 illustrates full viewing angle-display characteristics of an image display apparatus, according to one or more embodiments.

FIG. 4 illustrates a configuration of a pixel of an image display apparatus according to one or more embodiments, and FIG. 5 illustrates full viewing angle-display characteristics of an image display apparatus according to one or more embodiments.

Referring to FIG. 4, in an embodiment, a display panel 401 may display stereo images through, for example, a right image pixel 403 and a left image pixel 405.

In this instance, the display panel 401 may include a plurality of display pixels, and each, for example, of the display pixels may include a right image pixel 403 and a left image pixel 405.

As shown in FIG. 5, in this embodiment, the shown lenticular lens 407 may also have full viewing angle-display characteristics. In this instance, a center of each of the plurality of lens columns making up the lenticular lens 407, e.g., lenses 502, may be configured to coincide with a center of the display pixel of display panel 501.

As shown in such an example of FIG. 5, here, only left image pixel information (Left1-3) of each pixel 1-3 may be viewed in a left side of a viewing area where the center of each of the plurality of lens columns coincides with the center of the display pixel. Similarly, only right image pixel information (Right1-3) of each pixel 1-3 may be viewed in a right side of the viewing area where the center of each of the plurality of lens columns coincides with the center of the display pixel. Here, as only an example, the left image pixel information may denote images displayed through the left image pixel 405, and the right image pixel information may denote images displayed through the right image pixel 403.

Figure 6:
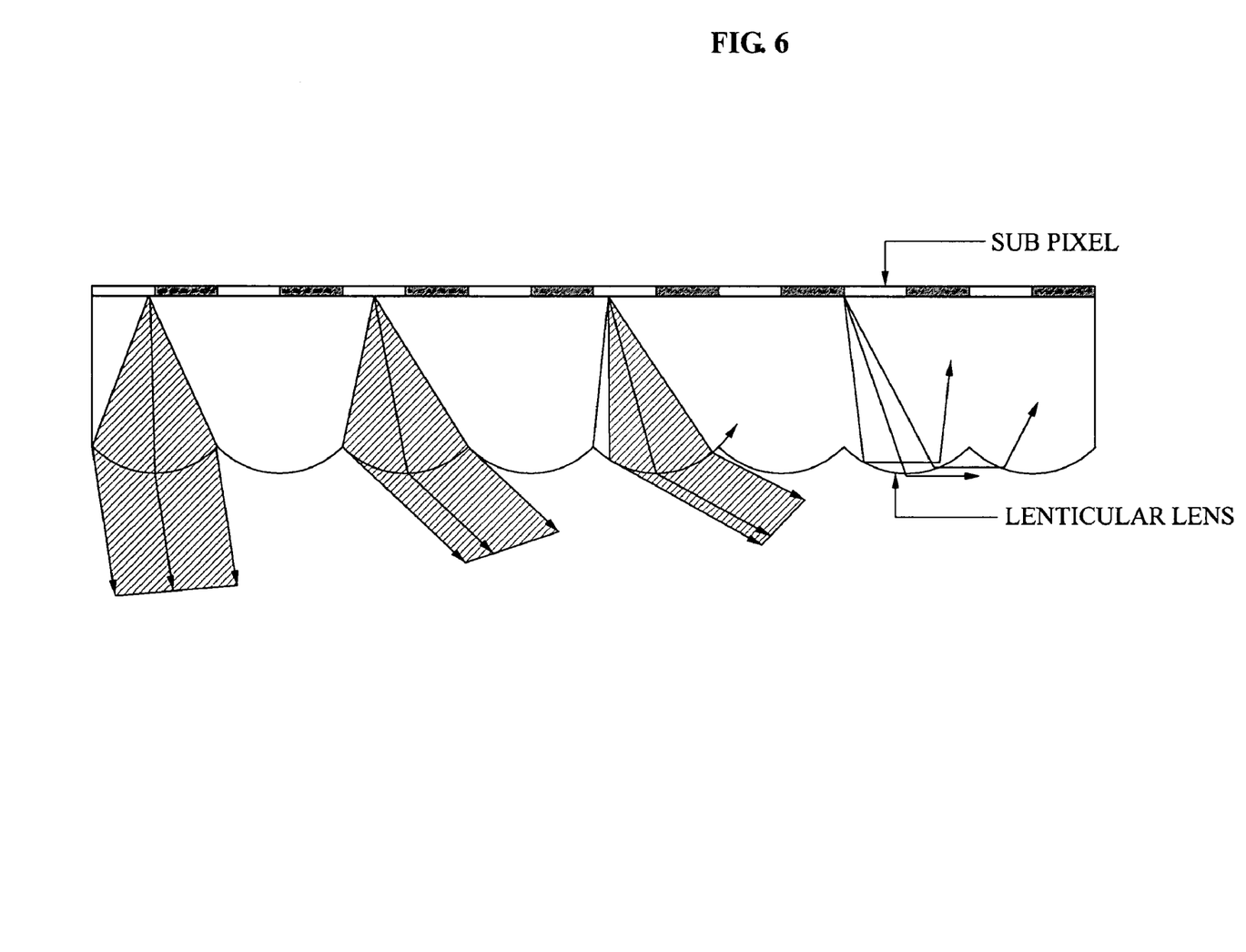
FIG. 6 illustrates characteristics of an optical path of a lenticular lens, according to one or more embodiments.

FIG. 6 illustrates characteristics of an optical path of a lenticular lens, according to one or more embodiments.

Referring to FIG. 6, a display pixel may be located in a focus of lens, and accordingly at least one light emitting from a point on the display pixel passes through the lens to form a parallel light. A sub pixel shown in FIG. 6 may denote any one of a left image pixel or a right image pixel, for example.

Design conditions may vary implementing optical path characteristics of the lenticular lens according one or more embodiments.

Figure 7:
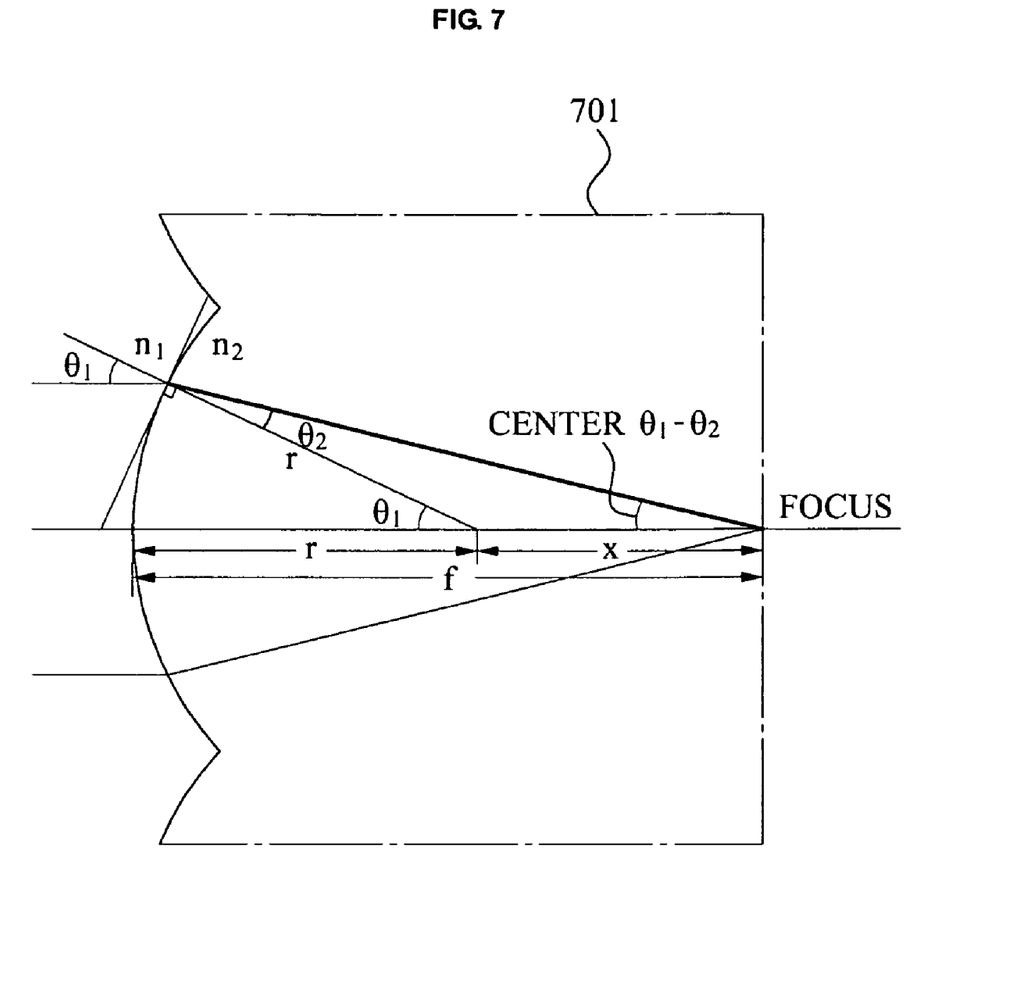
FIG. 7 illustrates an optical design condition of a lenticular lens, according to one or more embodiments.

FIG. 7 illustrates an optical design condition of a lenticular lens 701, according to one or more embodiments.

As only an example, it may be assumed that the lenticular lens 701 is a spherical lens, with a curvature radius of each of a plurality of lens columns making the lenticular lens 701 being 'r', the refractive index being 'n2', and with the example refractive index of air being 'n1'. A parallel light may thus bend according to Snell's Law where the parallel light enters while creating an angle θ1 with a normal line of a plane of the lens. In this instance, an angle θ2 created between a light of the lenticular lens 701 side and the normal line of the plane of the lens may be represented by the below Equation 1, for example.

$$n2/n1 = \sin(\theta 1)/\sin(\theta 2) \quad \text{Equation 1:}$$

Equation 1 may be abbreviated as below Equation 2, for example.

$$n2/n1=\theta1/\theta2 \qquad \text{Equation 2:}$$

In this instance, when a distance reaching from a center of the lens to a focus thereof is x, a value of x may be represented, using law of sines, by the below Equation 3, for example.

$$x=r*\sin(\theta2)/\sin(\theta1-\theta2)=r*n1/(n2-n1) \qquad \text{Equation 3:}$$

Using the above Equation 3, a focal length f reaching from the normal line of the plane of the lens to a focus thereof may be represented by the below Equation 4, for example.

$$f=x+r=r*n1/(n2-n1)=r*n2/(n2-n1) \qquad \text{Equation 4:}$$

In this instance, when a refractive index of the example air is '1', the focal length f may be represented by the below Equation 5, for example.

$$f=r*n2/(n2-1) \qquad \text{Equation 5:}$$

In this example, a light parallel to the lens may, thus, pass through a focus regardless of a location of an incident plane, and the focal length f may be the thickness of the lenticular lens 701.

Figure 8:
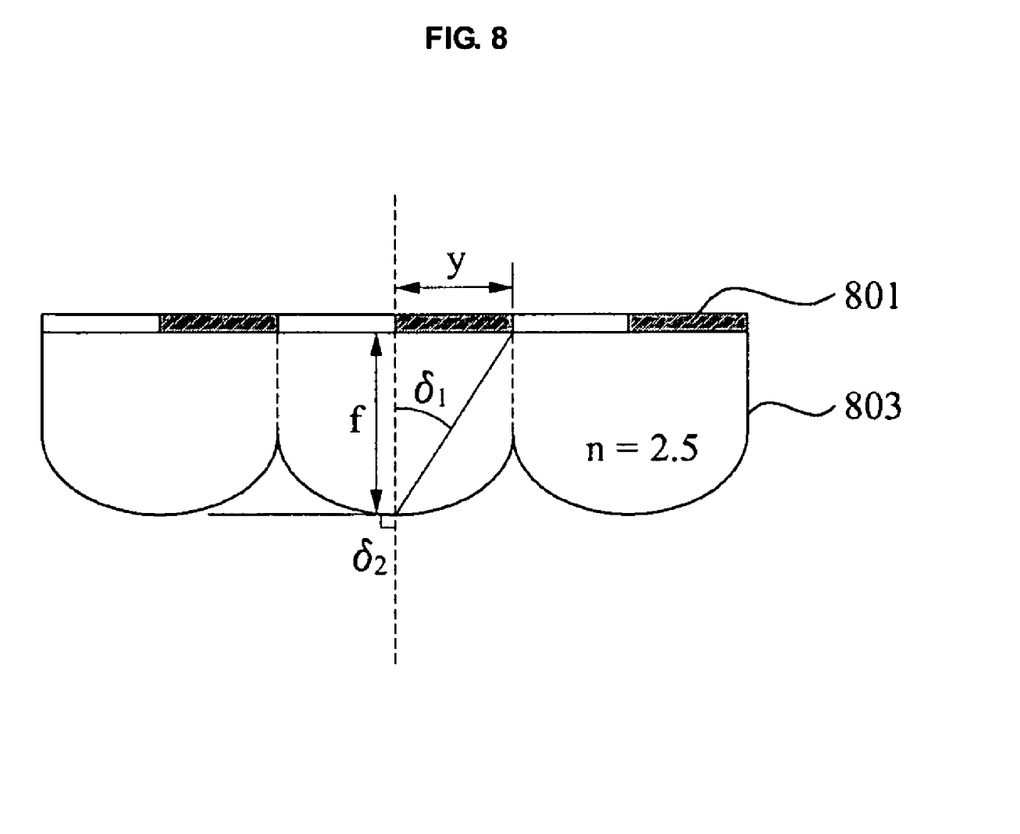
FIG. 8 illustrates an optical design of a lenticular lens, according to one or more embodiments.

FIG. 8 illustrates an optical design example of a lenticular lens, according to one or more embodiments.

Referring to FIG. 8, the lenticular lens 803 may include a plurality of lens columns, for example. In an embodiment, each pitch of the plurality of lens columns may be 2p, and a curvature radius and focal length of each of the plurality of lens columns may be determined according to a refractive index of the lenticular lens. Here, p may denote a pitch of display pixels making up the display panel 801.

In this example, noting that alternatives are available, it may be assumed that a refractive index n of the lenticular lens 803 is 2.5, and a curvature radius of the lenticular lens is r. Light entering horizontally with respect to a center of the lenticular lens 803 may have an angle δ1 while passing through the lens, and δ1 may be represented, using Snell's law, by the below Equation 6, for example.

$$\delta1=\sin^{-1}(1/n)=\sin^{-1}(1/2.5)=23.58° \qquad \text{Equation 6:}$$

In addition, here, the focal length f of the lenticular lens 803 may be represented, using Equation 5, by the below Equation 7, for example.

$$f=r*n/(n-1)=r*5/3. \qquad \text{Equation 7:}$$

Accordingly, an example distance y moved while a light entering parallel to the center of the lens reaches a display pixel located in the focal length may be represented by the below Equation 8, for example.

$$y=f*\tan(\delta1)=r*5/3*\tan(23.58°)=0.72*r. \qquad \text{Equation 8:}$$

The curvature radius r may be determined by designing the distance y to be the same as the pitch of the display pixel. Accordingly, the curvature radius r may be represented by the below Equation 9, for example.

$$r=p/0.72=1.39*p. \qquad \text{Equation 9:}$$

In this example, the pitch of the lenticular lens 803 and the thickness of the lens may further be represented by the below Equation 10, for example.

$$\text{lens pitch}=2*\text{pixel pitch}=2*p; \text{ and}$$

$$\text{lens thickness}=\text{focal length } f \text{ of lens}=2.31*p \qquad \text{Equation 10:}$$

The lenticular lens 803 corresponding to Equations 6 to 10 may have a full viewing angle and simultaneously display 2D images and 3D images, again noting that such representations are merely for descriptive purposes and addition and/or alternative embodiments are equally available.

In addition, according to an embodiment to embody the lenticular lens having full viewing angle display characteristics, an optical device of a high refractive index may be used. In this instance, when a refractive index is relatively low, for example, the refractive index n may be 2 or less, the full viewing angle display characteristics may be difficult to be implemented, however, wide viewing angle display characteristics capable of simultaneously displaying 2D and 3D images within a sufficient viewing angle based on design of the lens may be implemented.

Figure 9:
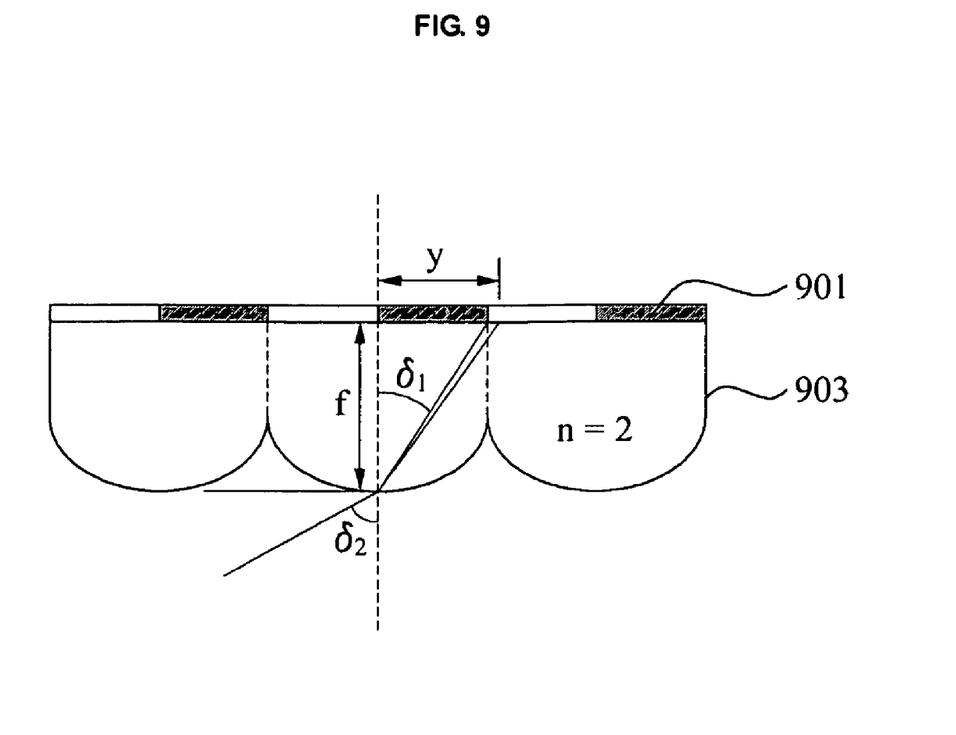
FIG. 9 illustrates a refractive index of a lenticular lens being 2, according to one or more embodiments.

FIG. 9 illustrates an example in which a refractive index of a lenticular lens 903 is 2, according to one or more embodiments of the present invention.

In such an embodiment, using the above example Equations 1 to 5, a lens parameter of the lenticular lens 903 may be represented by the below Equation 11, for example.

$$r=2*p;$$

$$\text{lens pitch}=2*p; \text{ and}$$

$$\text{lens thickness}=4*p \qquad \text{Equation 11:}$$

Referring to FIG. 9, in this example, the lenticular lens may include a plurality of lens columns, with each pitch of the plurality of lens columns being 2p, and a curvature radius and focal length of each of the plurality of lens columns being determined according to a refractive index of the lenticular lens. Here, p may denote a pitch of pixels making up the display panel 901.

In this instance, light passing through a center of the lenticular lens 903 may pass through the lens and advance through air with a normal line angle δ2 less than 90°, with the normal line angle δ2 being 63.4° when n is 2.0, for example. Accordingly, in this example, a range in which image inversion does not occur is within about 127°, such that the image inversion may not occur with respect to a relatively wide viewing angel.

Figure 10:
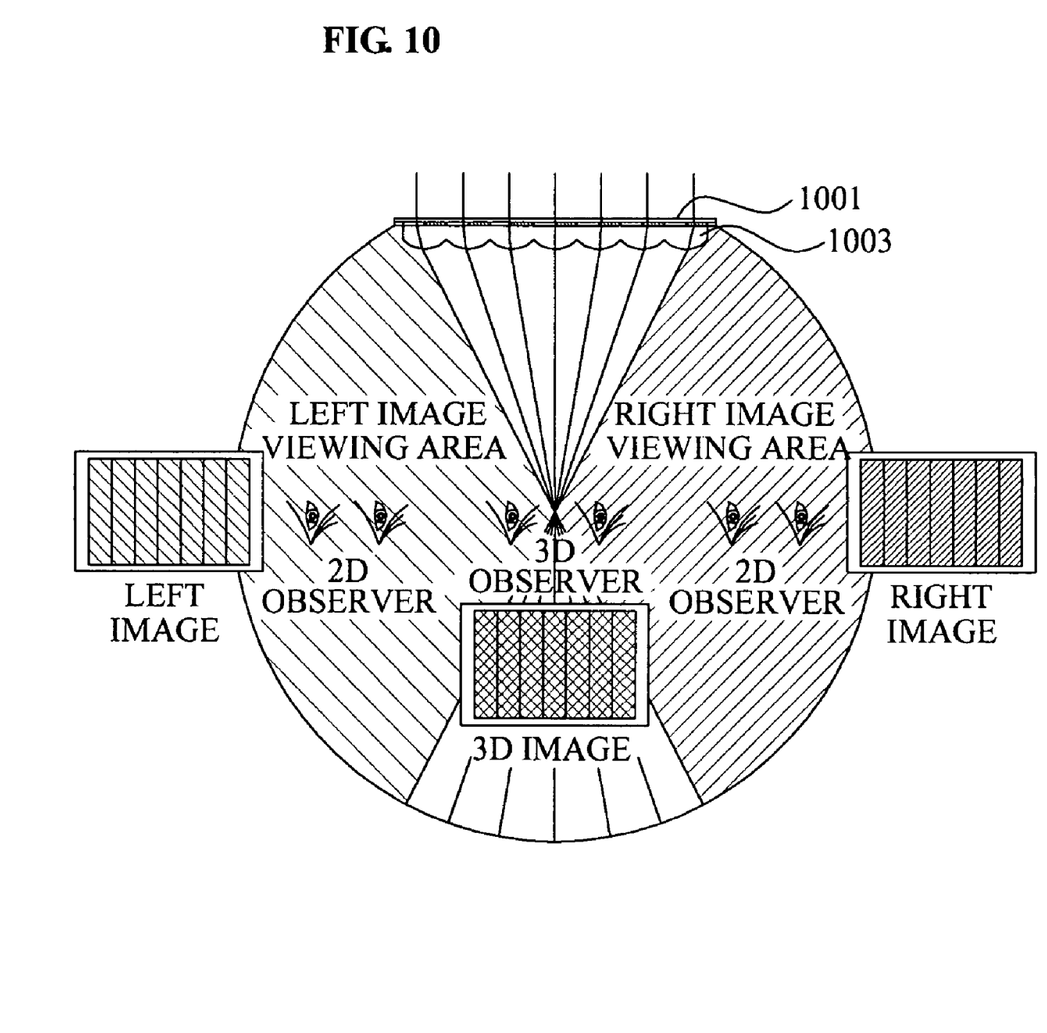
FIG. 10 illustrates an image in a way that a user feels with respect to an image display apparatus, according to one or more embodiments.

FIG. 10 illustrates an image in a way that a user feels with respect to an image display apparatus, according to one or more embodiments.

Referring to FIG. 10, a display panel unit 1001 may display left images and right images. A lenticular lens unit 1003 may selectively spatially divide the left and right images and display the same.

In this instance, a user may view only the left images to thereby view 2D images when eyes of the user are located in the example left image viewing area. Similarly, the user may view only right images to thereby view also 2D images when the eyes of the user are located in the example right image viewing area. Further, when the eyes of the user are located in a boundary between the left image viewing area and the right viewing area, left images may be primarily applied to a left eye and right images may be primarily applied to a right eye, and thus the user may view 3D images.

Figure 11:
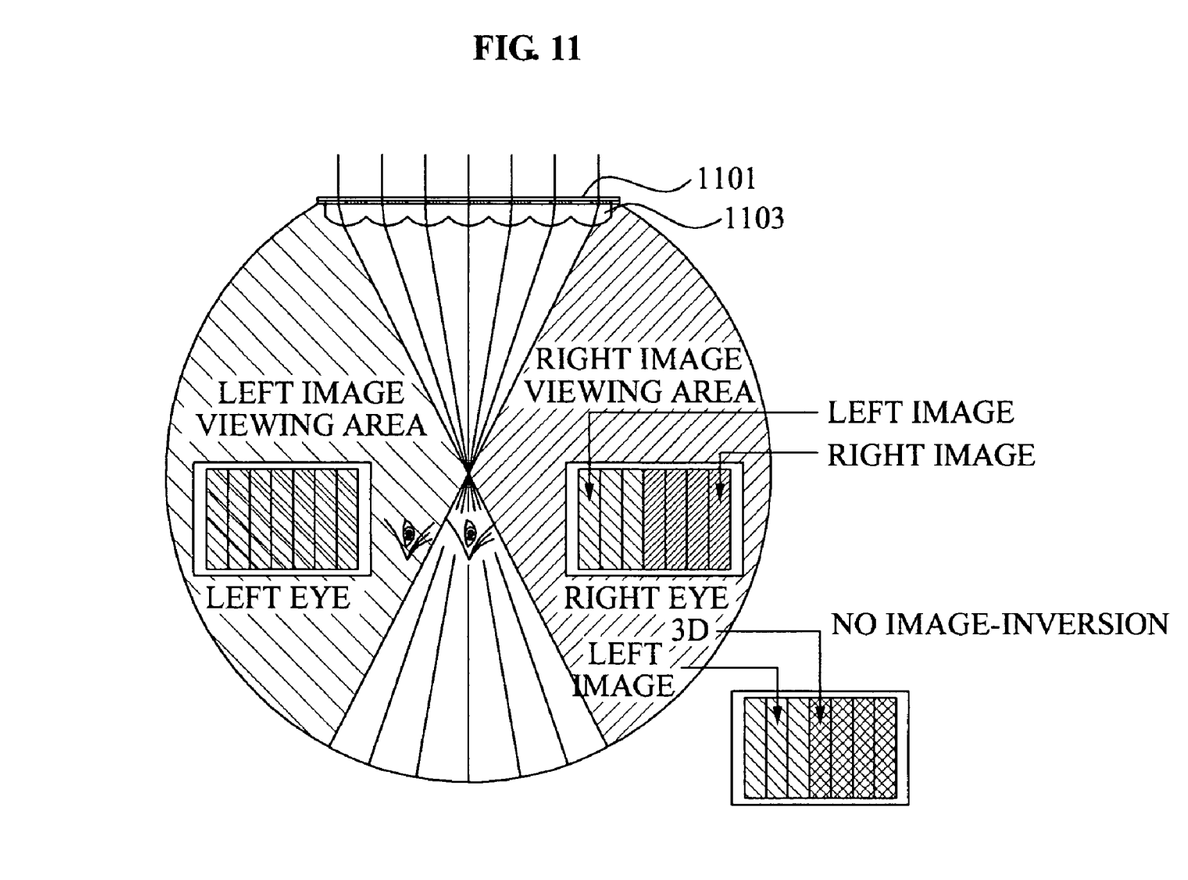
FIG. 11 illustrates another image in a way that a user feels with respect to an image display apparatus, according to one or more embodiments.

FIG. 11 illustrates another image in a way that a user feels with respect to an image display apparatus, according to one or more embodiments. Referring to FIG. 11, a display panel unit 1101 may display left images and right images. A lenticular lens unit 1103 may selectively spatially divide the left and right images and display the same.

As shown in FIG. 11, location of eyes of a user are shown to be overlapped with any one of a left image viewing area and a right image viewing area and a 3D image area. In this case, the user may view entire left images with a left eye, and view a part of the left and right images with a right eye. Accordingly, the user may view only a part of a screen as being 3D images, and the remaining parts thereof as being 2D images. In this case, loss in a 3D effect may occur, however, the image inversion, where images applied to left and right eyes are inversed with each other, may not occur, which helps to maintain relatively low visual fatigue.

Figure 12:
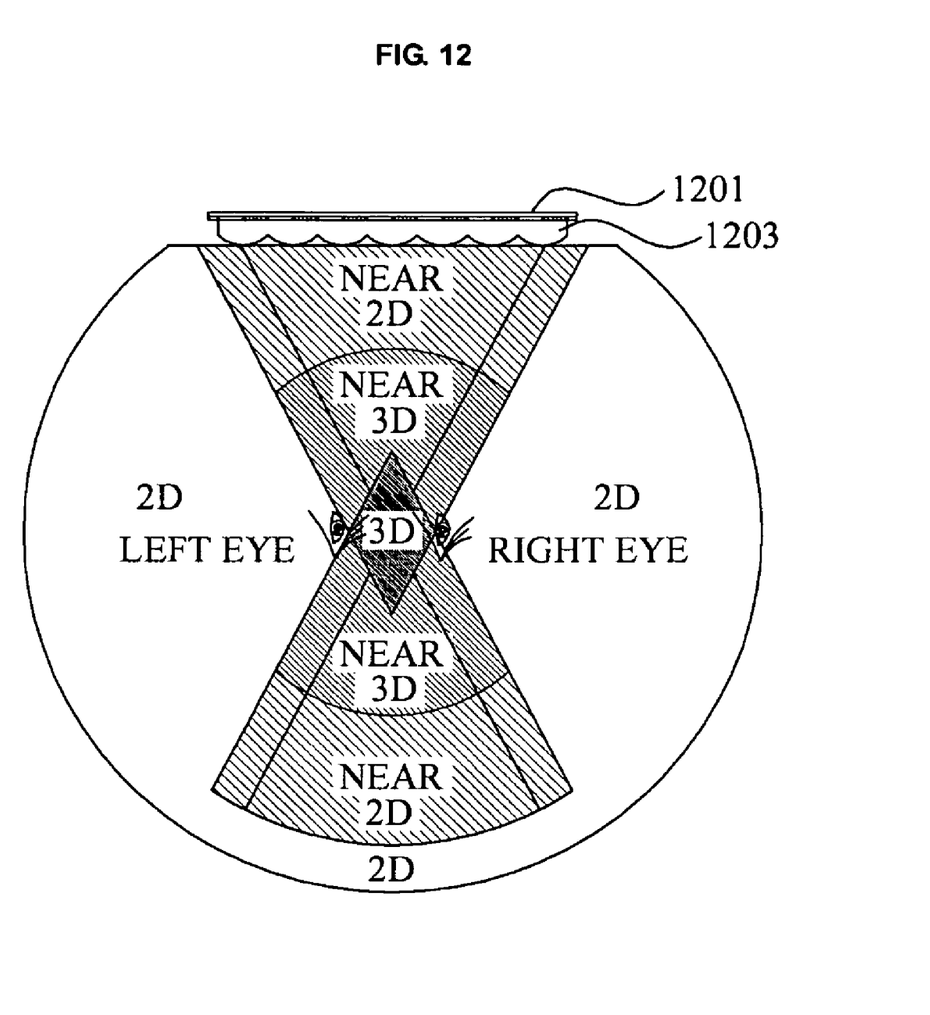
FIG. 12 illustrates still another image in a way that a user feels with respect to an image display apparatus, according to one or more embodiments.

FIG. 12 illustrates still another image in a way that a user feels with respect to an image display apparatus, according to one or more embodiments. Referring to FIG. 12, a display panel unit 1201 may display left images and right images. A lenticular lens unit 1203 may selectively spatially divide the left and right images and display the same.

In FIG. 12, an area where a user may view 2D and 3D images with respect to an entire viewing area is shown. In this example embodiment, the user may view 2D images without deterioration in image quality when the user is located in a left or right side of the display. Here, the user may view observably perfect 3D images when the user is located in the example sweet spot, e.g., the single sweet spot along a middle point of the display. The 3D effect of a part of a screen may become deteriorated, as to be observed as changing to 2D images, when the user is located over the 2D and 3D image viewing areas or moves forward or backward from the sweet spot, and this may be determined depending on how far from the sweet spot the user is located, including potentially where or how far from the sweet spot the user is determined to be located. The 3D effect may, thus, appear to be deteriorated when the user is located sufficiently near the screen or located sufficiently far from the screen, so that the user observes 2D images. In the above-mentioned cases, image inversion may not occur.

As described above, according to one or more embodiments, a user may simultaneously or selectively view 2D images and 3D images without deterioration in image quality or feeling visual fatigue.

According to one or more embodiments, 3D images may be viewed from along a middle portion of a screen when the user desires to view 3D images, and 2D images may be viewed from along the remaining parts of the screen without deterioration in image quality.

According to the one or more embodiments, image inversion may further be prevented from occurring with respect to both of the 3D and 2D image viewing, thereby reducing visual fatigue.

While aspects of the present invention has been particularly shown and described with reference to differing embodiments thereof, it should be understood that these exemplary embodiments should be considered in a descriptive sense only and not for purposes of limitation. Descriptions of features or aspects within each embodiment should typically be considered as available for other similar features or aspects in the remaining embodiments.

Thus, although a few embodiments have been shown and described, it would be appreciated by those skilled in the art that changes may be made in these embodiments without departing from the principles and spirit of the invention, the scope of which is defined in the claims and their equivalents.

What is claimed is:

1. An image display apparatus, comprising:
    a display panel unit to display images; and
    a lens unit to spatially separate the images simultaneously displayed by the display panel unit to form a two dimensional (2D) image display area between the display apparatus and a user so as to provide display of a 2D image and to form a three dimensional (3D) image display area between the display apparatus and the user so as to provide display of a 3D image,
    wherein the lens unit is configured to simultaneously provide full viewing-angle display characteristics based on corresponding high refractive indexes in areas of the lens unit displaying the 2D image by spatially separating an image and areas of the lens unit displaying the 3D image by spatially separating plural images.

2. The image display apparatus of claim 1, wherein the images displayed by the display panel unit are related left and right images.

3. The image display apparatus of claim 1, wherein the lens unit includes a lenticular lens having the full viewing-angle display characteristics based on the corresponding high refractive indexes.

4. The image display apparatus of claim 3, wherein the lenticular lens has a refractive index of 2 or more, with a curvature radius and a lens thickness being determined according to the refractive index, in the areas of the lens unit displaying the 2D image and the areas of the lens unit displaying the 3D image.

5. The image display apparatus of claim 1, wherein the full viewing-angle display characteristics represent a viewing range in which image inversion is minimized.

6. The image display apparatus of claim 5, where the viewing range in which the image inversion does not occur is within about 127°.

7. An image display method comprising controlling a plurality of aligned lenses by spatially separating a first image to form at least one first image viewing area to display at least a 2D image, spatially separating a second image to form at least one second image viewing area to display at least a 2D image, and spatially separating an image resulting from a combination of the first and second images to form at least one third image viewing area to display at least a 3D image, with the first and second images being to be correspondingly simultaneously displayed in the first, second, and third image view areas,
    wherein the controlling of the plurality of aligned lenses is based on the plurality of aligned lenses being configured to simultaneously provide full viewing-angle display characteristics based on corresponding high refractive indexes by first lenses of the aligned lenses spatially separating the first image, second lenses of the aligned lenses spatially separating the second image, and third lenses of the aligned lenses spatially separating the image resulting from the combination of the first and second images,
    wherein the image viewing areas are formed between the display apparatus and a user.

8. The method of claim 7, wherein the plurality of aligned lenses is a lenticular lens having the full viewing-angle display characteristics.

9. An image display apparatus comprising a lenticular lens controller to control a lenticular lens unit to spatially separate a first image, of at least a first and second images, to form at least one first image viewing area to display at least a 2D image, and spatially separate an image resulting from a combination of the first and second images to form at least one other image viewing area to display at least a 3D image, with the first and second images defined for correspondingly simultaneously being displayed at least in the first and other image viewing areas,
    wherein the controlling of the lenticular lens by the lenticular lens controller is based on the lenticular lens being configured to simultaneously provide full viewing-angle display characteristics based on corresponding high refractive indexes by first lenses of the lenticular lens spatially separating the first image, second lenses of the of the lenticular lens spatially separating the second image, and third lenses of the of the lenticular lens spatially separating the image resulting from the combination of the first and second images,
wherein the image viewing areas are formed between the display apparatus and a user.

10. The image display apparatus of claim 9, further comprising:
a display panel unit to display separate images including the first and second respective images.

11. An image display apparatus, comprising:
a display panel unit to display a stereo image including a left image and a right image; and
a lenticular lens unit to spatially separate the left image to form a left image viewing area, spatially separate the right image to form a right image viewing area, and spatially separate the stereo image to form a 3D image viewing area,
wherein the lenticular lens is configured to simultaneously provide full viewing-angle display characteristics based on corresponding high r PREVIOUSLY PRESENTED efractive indexes by first lenses of the lenticular lens spatially separating the left image, second lenses of the of the lenticular lens spatially separating the right image, and third lenses of the of the lenticular lens spatially separating the stereo image,
wherein the image viewing areas are formed between the display apparatus and a user.

12. The image display apparatus of claim 11, further comprising:
a control unit to control movement of lenses of the lenticular lens unit to control a spatial location of the 3D image viewing area.

13. The image display apparatus of claim 11, further comprising:
a control unit to selectively control display of the stereo image so that the full viewing-angle display characteristics is an entire viewing-angle area of the display panel unit and is displayed as a 2D image and so that 2D images and the stereo image are simultaneously displayed.

14. The image display apparatus of claim 11, wherein the lenticular lens unit is included with a plurality of lens columns, each pitch of the plurality of lens columns being 2p, with p being a pitch of pixels making up a corresponding display panel of the display panel unit, and a curvature radius and focal length of each of the plurality of lens columns being determined according to a refractive index of the lenticular lens.

15. The image display apparatus of claim 14, wherein the refractive index is 2, a curvature radius of each of the plurality of lens columns is 2p, and a focal length is 4p, in the first, second, and third lenses.

16. The image display apparatus of claim 14, wherein the refractive index is 2.5, a curvature radius of each of the plurality of lens columns is 1.39p, and a focal length is 2.31p, in the first, second, and third lenses.

17. An image display method comprising controlling plural aligned lenses to spatially separate a first image, of at least a first and second images, to form at least one first image viewing area to display at least a 2D image, and spatially separate an image resulting from a combination of the first and second images to form at least one other image viewing area to display at least a 3D image, with the first and second images defined for correspondingly simultaneously being displayed at least in the first and other image viewing areas,
wherein the controlling of the plurality of aligned lenses is based on the plurality of aligned lenses being configured to simultaneously provide full viewing-angle display characteristics based on corresponding high refractive indexes by first lenses of the aligned lenses spatially separating the first image and second lenses of the aligned lenses spatially separating the image resulting from the combination of the first and second images,
wherein the image viewing areas are formed between the display apparatus and a user.

18. The method of claim 17, wherein the plurality of aligned lenses is a lenticular lens having the full viewing-angle display characteristics.

* * * * *

UNITED STATES PATENT AND TRADEMARK OFFICE
CERTIFICATE OF CORRECTION

| | | |
|---|---|---|
| PATENT NO. | : 8,368,745 B2 | Page 1 of 1 |
| APPLICATION NO. | : 12/453114 | |
| DATED | : February 5, 2013 | |
| INVENTOR(S) | : Dong Kyung Nam et al. | |

It is certified that error appears in the above-identified patent and that said Letters Patent is hereby corrected as shown below:

In the Claims
Column 11, Line 1, In Claim 9, before "lenticular" delete "of the".
Column 11, Line 2, In Claim 9, before "lenticular" delete "of the".
Column 11, Lines 20-21, In Claim 11, delete "r PREVIOUSLY PRESENTED efractive" and insert -- refractive --, therefor.
Column 11, Line 23, In Claim 11, before "lenticular" delete "of the".
Column 11, Line 24, In Claim 11, before "lenticular" delete "of the".

Signed and Sealed this
Fourth Day of June, 2013

Teresa Stanek Rea
*Acting Director of the United States Patent and Trademark Office*